June 18, 1968 A. L. HUBBARD 3,388,537
COTTON HARVESTER

Filed Sept. 10, 1965 2 Sheets-Sheet 1

*INVENTOR.*
A. L. HUBBARD

BY *William A. Murray*

ATTORNEY

June 18, 1968   A. L. HUBBARD   3,388,537
COTTON HARVESTER

Filed Sept. 10, 1965   2 Sheets-Sheet 2

INVENTOR.
A. L. HUBBARD
BY *William A. Murray*
ATTORNEY

United States Patent Office 3,388,537
Patented June 18, 1968

3,388,537
COTTON HARVESTER
Arthur L. Hubbard, Des Moines, Iowa, assignor to Deere & Company, Moline, Ill., a corporation of Delaware
Filed Sept. 10, 1965, Ser. No. 486,330
19 Claims. (Cl. 56—44)

This invention relates to a cotton harvester and more particularly to a cotton harvester utilizing an upright picking mechanism on one side of a plant passage having spindles extending outwardly into the plant passage and a cooperating pressure plate structure on the opposite side of the passage that maintains pressure between the plants and spindles. Still more particularly this invention relates to a particular type of pressure plate and its means mounting it on the cotton picker housing.

In commercial type cotton pickers there is conventionally provided a housing structure having an upright fore-and-aft extending plant passage through which plants may pass as the harvester advances. Contained within the housing and offset to one side of the passage is an upright picking mechanism, normally in the form of a picker drum having laterally extending spindles that project into the passage as the drum rotates and harvests the bolls of cotton from the plants. On the opposite side of the passage is provided a pressure plate structure normally biased against movement outwardly in respect to the passage tending to compress the cotton plants in the passage and into the path of the spindles.

In many locations, due to climatic and soil conditions, the cotton bolls on the lower portion of the cotton plants mature considerably earlier than those at the top of the cotton plants. In harvesting this cotton, therefore, it is often desirable to harvest only the lower portion of the plants and to leave the green bolls on the upper portion of the plant on the plants for further harvesting. In this type of cotton harvester the pressure plate applies substantially equal pressure to the entire cotton plant throughout its height, and the green bolls at the top of the plants are often dislodged from the plant and are scattered on the ground and consequently lost.

It is therefore the primary object of the present invention to provide a pressure plate structure composed of a plurality of articulately interconnected plates that include rear and front plates with a central plate means therebetween. The front and rear plates have rear and front edges respectively that are vertically disposed and converge downwardly. The central plate means extends in the spacing between the converging edges and is joined with the edges by junctures that permit the upper portion of the plate means to deflect outwardly relative to the lower plate means and permit the central plate means to deflect outwardly relative to the front and rear plates. Provided behind the plate structure are spring biasing means that tend to urge the plate structure to an innermost upright position. In one form of the invention a central plate means includes a single plate that is substantially triangular in shape and is connected to the front edge of the rear plate and the rear edge of the front plate so that the upper wide portion of the triangular-shaped central plate may deflect outwardly. In a second form of the invention the central plate means is composed of a pair of upright plates that are joined by an upright pivot and has also a rear edge connected to the front edge of the rear plate and a front edge connected to the rear edge of the front plate so that the two central plates may deflect outwardly.

More specifically, this invention relates to a particular type of pressure plate structure that includes upper and lower plates interconnected about a diagonal juncture extending from the front upper part of the passage to the lower rear part of the passage. The upper rear plate is disposed normally opposite the cotton picking spindles of the harvesting drum and due to the diagonal juncture is capable of pivoting away from the plant passage in an amount proportionate to its vertical position above the ground. Behind the pressure plate structure and within the housing are provided springs or other types of biasing means that maintain pressure against the pressure plate structure so that it will resist movement of the plates away from the passage. If it is desired to harvest the entire cotton plants, there is provided a latch between the upper and lower plates that locks the rear upper plate against movement relative to the forward lower plate. When the latch is connected, therefore, the entire plate maintains equal pressure on the plant throughout the entire height of the passage and consequently the entire plants are harvested. If it is desired to hold the upper rear plate away from the passage, the latch means is adjustable to retain the upper rear plate in an outwardly retracted position.

It is a further object of the invention to provide a series of vertically spaced springs that engage and bias the plates to their innermost upright positions. The springs are torsion-type springs with portions thereof that engage the outer surface of the pressure plate structure. The springs may be adjusted vertically along their upright support so that the number of springs that engage individual plates of the plate structure may be adjusted to thereby selectively determine the amount of pressure on each of the plates of the plate structure. Therefore, should it be desired to reduce the amount of pressure against the central plate means, such may be done by reducing the number of springs engaging the plate means.

Other objects and advantages of the present invention will become apparent to those skilled in the art as the nature of the invention is better understood from the following description and as shown in the accompanying drawings.

Figures 1, 2:
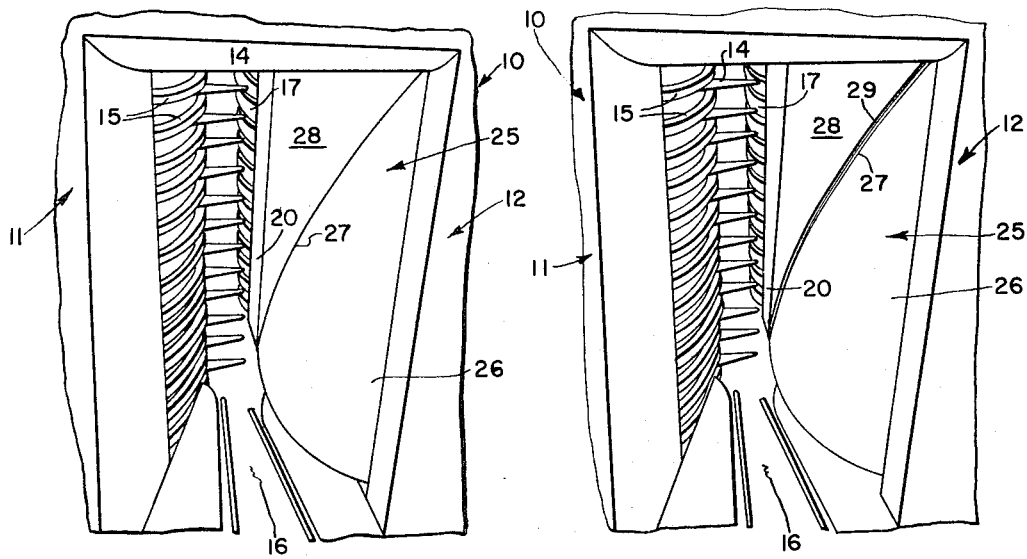
FIG. 1 is a front perspective view showing a portion of the housing and the plant passage formed by the housing and incorporating the pressure plate structure of the present invention.
FIG. 2 is a view similar to FIG. 1 but showing the pressure plate in a retracted or outer position.

The cotton harvester includes a main housing structure 10 having casings 11, 12 positioned in transverse spaced apart relation to define a fore-and-aft extending passage 16 through which plants may pass as the harvester advances. Supported in the casing 11 is an upright spindle drum 13 having a series of laterally extending spindles 14 extending into the passage 16 for the purpose of harvesting the ripened cotton bolls from the plants in the passage. The casing 11 has an upright inner side wall structure composed in part of a series of vertically spaced grid bars 15 between which the spindles 14 project into the passage. The drum 13 is in the forward portion of the casing 11. A similar drum, not shown, is offset rearwardly from the drum 13 in the casing 12. Grid bars 17 are provided adjacent the passage 16 at the rear of the casing 12. Suitable floor structures, such as at 18, 19, are provided within the respective casings 11, 12 for purposes of supporting the various picking drums and other mechanism contained within the casings. The cotton harvester in general including the housing structure, other than the portion thereof presently to be described, as well as the picking mechanism may be of a conventional type and is more adequately described and shown in U.S. Patent 2,904,948 which issued to Mr. A. L. Hubbard Sept. 22, 1959. Reference, therefore, to that patent may be made for more description of the housing structure and harvesting mechanism. An upright panel 20 has a rear rolled edge bearing against the forward ends of the grid bars 17 and is yieldably held against them by a spring 21.

Facing the spindles 14 across the passage 16 is an upright arcuate-shaped plate structure 25 composed of a lower plate 26 having an upper downwardly and rearwardly inclined edge 27 that converges with the forward upright edge of the panel 20. The plate structure further includes in upper complementary plate 28 extending upwardly from a lower downwardly and rearwardly inclined edge 29 adjoining the upper edge 27 to define a diagonal juncture between the plates 26, 28. The plate 28 expands the expanse between the converging edges at the forward end of the panel 20 and the inclined edge 27. A vertical pivot rod 24 interconnects the panel 20 and the rear upright edge of the panel 28. The plates 26, 28 complement one another to form a rectangular-shaped plate structure. An upright pivot pin or shaft 30 is supported in the housing casing 12 at the forward end of the passage. The lower plate 26 has a forward rolled end 31 applied around the pin 30 operating to pivotally support the entire plate structure 25 on the pin 30. Interjoining the plates 26, 28 across the diagonal juncture is hinge means composed of three hinges 32 that permit the upper plate 28 to swing outwardly in respect to the lower plate 26 and the passage 16.

Figures 3, 4:
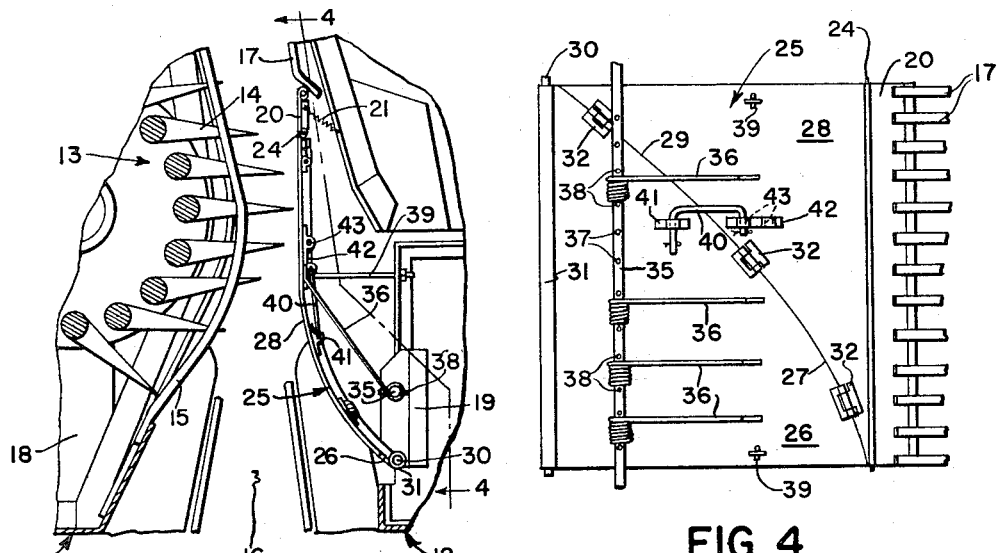
FIG. 3 is a horizontal sectional view of a portion of the harvester.
FIG. 4 is a view taken substantially along the line 4—4 of FIG. 3.

Supported on the floor structure 19 is an upright spring shaft 35 that carries torsion springs 36, part of which engage the outer side of the lower plate 26 and part of which engage the outer side of the upper plate 28. As may be seen in FIG. 4, the shaft 35 is provided with a series of vertically spaced tapped openings 37 that receive studs 38, the latter being inserted in the openings 37 above and below the coiled portions of the springs 36 to thereby lock the springs 36 in the desired location of the shaft 35. Thus, the springs may be selectively moved to apply the desired biasing pressure on the plates 26, 28 to move the plates to the normal innermost position adjacent the passage. A pair of limiting rods 39 having nuts on their ends is connected to the plates 26, 28 and part of the frame structure of the housing and permits and limits movement of the plates to the innermost position. Considerably more pressure is applied on the lower plate 26, than the upper plate 28 primarily through the use of additional springs on the lower plate 26 but also due to the location of the hinges 32 on which the upper plate may swing. Therefore, as may clearly be seen from viewing FIGS. 3 and 4, the spring means 36 operates to both bias the upper plate 28 against movement outwardly in respect to the passage and in respect to the lower plate 26. The spring means 36 also operates to bias the entire plate structure 25 against movement outwardly relative to the passage 16.

Latch means in the form of a U-shaped latch element 40 is provided for locking the relative position of the plate 28 in respect to the lower plate 26 in a plurality of positions. Extending inwardly from the outer face of the lower plate 26 is a lug 41 with an aperture adapted to receive one leg of the U-shaped latch element 40. Fixed to the outer surface of the plate 28 and substantially in the same plane of the lug 41 is a complementary lug 42 having a plurality of fore-and-aft spaced apart apertures 43 adapted to receive the opposite leg of the U-shaped latch element 40. The rearwardmost aperture 43 is used to receive the latch element 40 when it is desired to hold the upper plate 28 outwardly in respect to the passage 16. The forwardmost aperture is used when it is desired to hold the plate 28 in its innermost position in respect to the forward plate 26.

In operation, the latch element 40 is normally used when it is desired to place substantially equal pressure on the entire plate structure 25 by the springs 36. In this position, the latch element is inserted in the forwardmost opening or aperture 43 of the lug 42. In this type of operation the entire plate structure 25 will yield outwardly as a unit and will not vary from top to bottom. Under certain conditions it is desired to permit the upper plate 28 to yield outwardly and the latch element 40 is then removed from any latched position. When operating under these conditions, the uppermost spring 36 will tend to bias the upper plate portion 28 into vertical alinement with the lower plate 26. However, as plants move through the passage, the pressure of the single spring 36 will be insufficient to hold the plate 28 in its vertical position and consequently the plate 28 will yield outwardly about the hinge means 32. Such a position is shown in FIG. 2. In this position the plate 28 is inclined outwardly from bottom to top and the upper portion of the plants receives little pressure thereon at their upper portions. Since this is the portion of the plant in which green bolls are most likely to remain, the condition is such that there will be little harvesting by the spindles 14 of the green bolls. If it is desired to lock the plate 28 in its outermost position as shown in FIG. 2, the latch element 40 is inserted in the aperture of the lug 41 and the rearwardmost aperture 43 of the lug 42. In this position very little pressure will be applied to the upper portion of the plants and very little harvesting of the green cotton bolls will occur.

There has thus been described a pressure plate apparatus or structure for maintaining various pressures on cotton plants as they move through a harvester comprising an upright main pivot member 30 at the forward end of the harvester and a pair of vertically complementary plates 26, 28 interjoined at a juncture inclined downwardly and rearwardly from an upper forward end adjacent the shaft 30 at the front end of the plant passage 16. Hinge means 32 are provided at the juncture so that the upper section may move outwardly and there are further provided means on the housing structure in the form of springs 36 that bear against the outer sides of the plates 26, 28 so as to bias the upper plate 28 against outward movement in respect to the lower plate 26 and the passage 16 and the entire plate structure composed of the plates 26 and 28 from moving outwardly in respect to the passage 16. There is provided a detachable latch 40 that may be utilized to rigidify the upper plate 28 with the lower plate 26.

Figure 5:
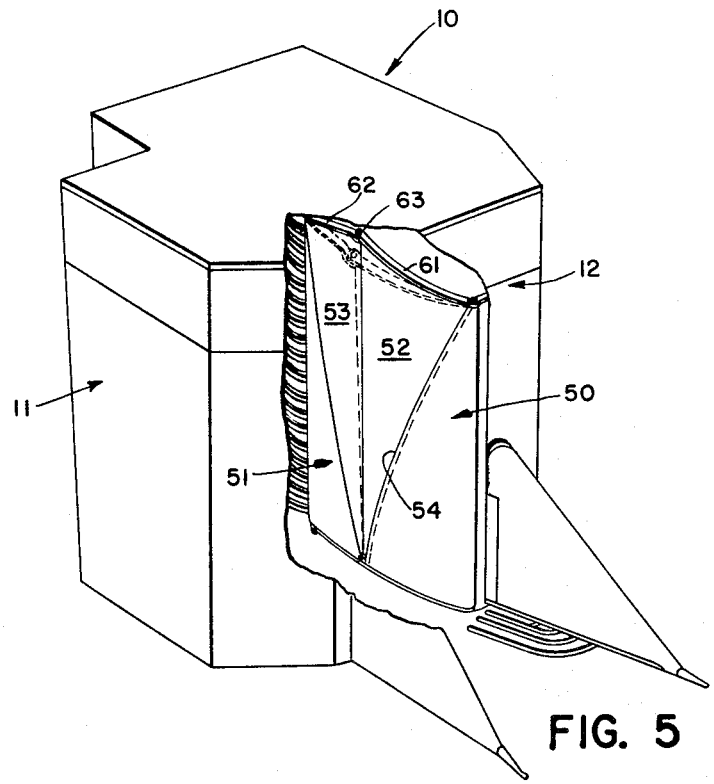
FIG. 5 is a side perspective view of a cotton harvesting unit with portions broken away and showing a slightly modified form of the invention.
Figure 6:
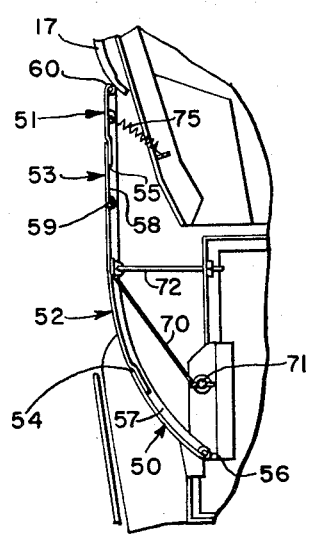
FIG. 6 is a sectional view taken substantially along the line 6—6 of FIG. 5.

In the form of the invention shown in FIGS. 5 and 6, the pressure plate structure is composed of a plurality of articulately interconnected upright plates that include a front plate 50, a rear plate 51, and a pair of central plates 52, 53. All of the plates 50–53 are triangular in shape with the front plate 50 having a rear inclined edge 54 and the rear plate 51 having a forward inclined edge 55. The edges 54, 55 are downwardly convergent and the central plates 52, 53 bridge the spacing between the edges 54, 55. The plate 50 has a forward rolled end 56 that is supported on a vertical pivot and it further has a horizontal lower flange 57 that extends rearwardly and is connected to a horizontal flange 58 of the rear plate 51 by a vertical pivot 59. The rear edge of the plate 51 has a rolled portion 60 that bears against the forward end of grid bars 17. The central plates 52, 53 have horizontally alined flanges 61, 62 that are interjoined by a vertical pivot 63 that is vertically alined with the lower vertical pivot 59. The forward end of the flange 61 is supported on the same vertical pivot that connects the rolled forward edge of the lower front plate 50. The rearward edge of the flange 62 is supported to pivot on the axis of the rolled rear edge 60 on the rear edge of the plate 51. The forward edge portion of the plate 51 adjacent the edge 55 is turned slightly to lie behind the rear edge portion of the central plate 53. The forward edge portion 64 of the front central plate 52 is turned slightly outwardly to lie alongside the rear surface of the edge portion of the forward plate 50. Consequently there is a juncture along the edge 55 and along the edge 54 of the respective plates 50, 51.

In the manner taught relative to the previous form of the invention there are provided a series of vertically spaced torsion springs 70 that are supported on a vertical shaft 71. Part of the torsion springs 70 bear against the central plate 52 and part thereof bear against the forward plate 50. A pair of vertical spaced limiting rods 72 is provided for each of the plates 50, 52 so as to limit the plates in movement toward the passage to a maximum innermost position. A pair of coiled springs 75 extends from the framework of the housing structure 10 to each of the plates 51, 53 so as to maintain the rear edge 60 of the plate 51 in engagement with the forward portions of the grid bars 17. The rear plate 51 is prevented from separating from the central plate 53 due to the condition that the lower flange 58 thereof is connected to the pivot pin 59 and the pivot pin 59 is positioned due to the pressure of the lower torsion spring 70, the pressure of the spring 75 not being sufficient to overcome the effect of the torsion load due to the springs 70.

Referring to FIG. 5, the full-lined position of the pressure plate structure is shown in the retracted position. The dotted representation of the pressure plate structure in FIG. 5 shows the location of the various pressure plates in their normal upright positions or in a position in which there is not sufficient pressure by the plants to move the respective plates outwardly. In operation there will normally be fewer springs 70 bearing against the plate 52 than upon the front plate 50. Conseqently the two central plates 52, 53 may more readily yield outwardly by the pressure of the plants than the front and rear plates 50, 51. The junctures adjacent the inclined diverging edges 54, 55 are such as to permit the plates 52, 53 to yield. Therefore, the lower pivot pin 59 is normally retained relatively close to the plant and the upper pivot pin 63 is capable or adapted to move relatively easily outwardly in respect to the passage. This is due to the fact that the only means of holding the respective pivot pins is the force of the torsion springs 70. Since there are more torsion springs 70 applied against the plate 50 than upon the plate 52 the pin 63 and the upper portions of the central plates 52, 53 may yield outwardly more readily than the lower portions and the pin 59. However, since the pin 59 is held in its innermost position the central plates will yield outwardly about their lower ends to thereby make the portion of the passage adjacent the spindles 14 relatively wide at the upper end of the passage and relatively narrow at the lower end. Such a condition is beneficial when it is desired not to harvest the upper portion of the plants. Thus, it may be seen that the central plates 52, 53 are capable of having their upper parts yieldable outwardly in respect to the lower parts and to be yieldable outwardly in respect to the front plate 50 and the rear plate 51.

While only two forms of the invention have been shown, it should be recognized that other forms and variations may occur to those skilled in the art without departing from the nature of the invention. Therefore it should be understood that the present disclosure was shown in concise and detailed manner for the purpose of completely illustrating the principles of the invention and it was not intended to limit or narrow the invention beyond the broad concept set forth in the appended claims.

What is claimed is:

1. A pressure plate structure for a cotton harvester housing having a plant passage comprising: a vertical pivot on the housing at the forward end of the passage; upright rectangular plate means supported on and extending rearwardly from the pivot and defining one side of the passage, the plate means including a pair of vertically complementary plates interjoined at a diagonal juncture inclined downwardly and rearwardly from an upper forward end; hinge means pivotally interconnecting the plates across the diagonal juncture; means on the housing behind the plate means for biasing the plate above the diagonal juncture against movement outwardly in respect to the plate below the diagonal juncture and for biasing the plate means against movement away from the passage; and latch means between the plates for locking the plates against relative movement about the hinge means.

2. A pressure plate structure for a cotton harvester housing having a plant passage comprising: a vertical pivot on the housing at the forward end of the passage; upright rectangular plate means supported on and extending rearwardly from the pivot and defining one side of the passage, the plate means including a pair of vertically complementary plates interjoined at a diagonal juncture inclined downwardly and rearwardly from an upper forward end; hinge means pivotally interconnecting the plates across the diagonal juncture; and means on the housing behind the plate means for biasing the plate above the diagonal juncture against movement outwardly in respect to the plate below the diagonal juncture.

3. A pressure plate structure for a cotton harvester housing having a plant passage comprising: a plate support on the housing; a pair of vertically complementary plates supported on the plate support and interjoined at a diagonal juncture inclined downwardly and rearwardly from an upper forward end; hinge means pivotally interconnecting the plates across the diagonal juncture; and means on the housing behind the plate means for biasing the plate above the diagonal juncture against movement outwardly in respect to the plate below the diagonal juncture.

4. A pressure plate structure for a cotton harvester housing having a plant passage comprising: a plate support on the housing; a pair of vertically complementary plates supported on the plate support and interjoined at a juncture extending rearwardly from a forward end at the front of the passage; hinge means pivotally interconnecting the plates across the juncture; and means on the housing behind the plate means for biasing the plate above the juncture against movement outwardly in respect to the plate below the juncture.

5. The invention as set forth in claim 4 in which the plate means is composed of upper and lower plates with downwardly and rearwardly inclined lower and upper adjoining edges respectively at the juncture.

6. The invention as set forth in claim 4 further characterized by a latch rigidifying the juncture to prevent bending about the hinge means.

7. The invention as set forth in claim 6 further characterized by the latch being adjustable to lock the upper plate in a plurality of positions in respect to the passage.

8. The invention as set forth in claim 6 further characterized by means on the housing behind the plate means for biasing the plate means against outward movement in respect to the passage.

9. A pressure plate structure for a cotton harvester housing having a plant passage comprising: a vertical pivot on the housing at the forward end of the passage; upright rectangular plate means including a lower plate supported on and exending rearwardly from the pivot and having an upper downwardly and rearwardly inclined edge, and an upper plate extending upwardly from a lower downwardly and rearwardly inclined edge adjoining the upper edge to define a diagonal juncture between the plates; means pivotally interconnecting the plates at the diagonal juncture; and means on the housing behind the plate means for biasing the upper plate against outward movement in respect to the passage and the plate means against outward movement in respect to the passage.

10. In a cotton harvester including upright housing structure having a fore-and-aft extending plant passage and an upright casing offset to and defining one side of the plant passage, and an upright harvesting drum supported in the casing and having lateral spindles adapted to extend into the passage for harvesting the plants, the improvement residing in an arcuate shaped upright wall structure defining the opposite side of the passage and including upper and lower upright plates continuing upwardly and outwardly respectively from a diagonal arcuate juncture between an upper outward end and an inner lower end; hinge means interconnecting the upper and lower plates along the diagonal juncture whereby the upper plate may swing outwardly in respect to the lower plate; vertical pivot means connecting the lower plate to the housing to permit the plate structure to swing outwardly in respect to the passage; means in the housing behind the plate structure for biasing the plate structure to an inner position in respect to the passage, the latter means being partially applied to the upper plate and partially to the lower plate; and a detachable latch device between the upper and lower plates for preventing relative movement between the plates about the hinge means.

11. In a cotton harvester including upright housing structure having a fore-and-aft extending plant passage and an upright casing offset to and defining one side of the plant passage, and an upright harvesting drum supported in the casing and having lateral spindles adapted to extend into the passage for harvesting the plants, the improvement residing in an arcuate shaped upright wall structure defining the opposite side of the passage and including upper and lower upright plates continuing upwardly and outwardly respectively from a diagonal arcuate juncture between an upper outward end and an inner lower end; hinge means interconnecting the upper and lower plates along the diagonal juncture whereby the upper plate may swing outwardly in respect to the lower plate; means connecting the lower plate to the housing to permit the plate structure to move outwardly in respect to the passage; means in the housing behind the plate structure for biasing the plate structure to an inner position in respect to the passage, the latter means being partially applied to the upper plate and partially to the lower plate.

12. In a cotton harvester including upright housing structure having a fore-and-aft extending plant passage and an upright casing offset to and defining one side of the plant passage, and an upright harvesting drum supported in the casing having laterally extending spindles adapted to extend into the passage for harvesting bolls from the plants, the improvement residing in: upright plate structure on the opposite side of the passage and defining that side of the passage and including front and rear plate portions having adjoining vertical edges interjoined by vertical pivot means, the front portion being composed of a front lower plate and a rear upper plate, the plates having a rearwardly and downwardly extending diagonal juncture between them for accommodating outward movement of the rear upper plate in respect to the front lower plate; and biasing means between the housing structure and plate structure for effecting movement of the latter toward an innermost position in respect to the passage.

13. The invention defined in claim 12 further characterized by the rear plate portion being composed of a front upper plate and a rear lower plate, and the latter plates have an upwardly and rearwardly extending diagonal juncture between them for accommodating outward movement of the front upper plate in respect to the rear lower plate.

14. The invention defined in claim 12 further characterized by the biasing means being adjustable to effect a smaller biasing pressure on the rear upper plate than on the front lower plate.

15. In a cotton harvester including upright housing structure having a fore-and-aft extending plant passage and an upright casing offset to and defining one side of the plant passage, and an upright harvesting drum supported in the casing having laterally extending spindles adapted to extend into the passage for harvesting bolls from the plants, the improvement residing in: upright plate structure on the opposite side of the passage and defining that side of the passage and including a plurality of articulately interconnected plates that include central, rear and front upright plates, the front upright plate and rear upright plate having respective rear and front vertical downwardly convergent edges, with the central of the plates extending between the edges and joining therewith about junctures permitting outward deflection of the upper part of the central of the plates relative to the lower part and outward deflection thereof relative to the front and rear plates; and biasing means between the housing structure and plate structure for effecting movement of the plates toward an innermost position in respect to the passage.

16. The invention defined in claim 15 in which the central of the plates includes a pair of plates joined at an upright pivot and further having front and rear edges joining the rear and front converging edges respectively of the front and rear plates at the aforesaid junctures.

17. The invention defined in claim 15 in which the central of the plates is a single upright plate having front and rear edges joining the rear and front converging edges respectively of the front and rear plates at the aforesaid junctures.

18. The invention defined in claim 15 in which the biasing means includes a plurality of springs extending between the housing structure and plate structure with the springs being adjustable to increase or decrease the effective force on the central of the plates in respect to the front and rear plates.

19. The invention defined in claim 18 in which the springs are a series of torsion springs supported on an upright support behind the plate structure and having portions thereof engaging the plates; and means on the upright support for selectively positioning the springs to selectively effect pressure against the plates.

References Cited

UNITED STATES PATENTS

| | | | |
|---|---|---|---|
| 2,830,427 | 4/1958 | Odom | 56—44 |
| 3,030,757 | 4/1962 | Hubbard | 56—43 |
| 3,047,996 | 8/1962 | Hubbard | 56—41 |
| 3,103,092 | 9/1963 | Templeton | 56—44 |
| 3,174,267 | 3/1965 | Bopf | 56—44 |
| 3,316,697 | 5/1967 | Hubbard | 56—44 |
| 3,336,736 | 8/1967 | Ramsey | 56—47 |
| 3,354,625 | 11/1967 | Taylor et al. | 56—44 |

RUSSELL R. KINSEY, *Primary Examiner.*